United States Patent [19]
Oetiker

[11] Patent Number: 5,615,456
[45] Date of Patent: Apr. 1, 1997

[54] TOLERANCE-COMPENSATING REUSABLE CLAMP STRUCTURE

[75] Inventor: Hans Oetiker, Horgen, Switzerland

[73] Assignee: Hans Oetiker AG Maschinen- und Apparate-fabrik, Horgen, Switzerland

[21] Appl. No.: 293,464

[22] Filed: Aug. 19, 1994

[51] Int. Cl.⁶ .................................................. F16L 33/04
[52] U.S. Cl. ............................................................ 24/20 R
[58] Field of Search .............................. 24/20 R, 20 EE, 24/20 TT, 20 S, 20 CW, 279

[56] References Cited

U.S. PATENT DOCUMENTS

| | | | |
|---|---|---|---|
| 4,910,832 | 3/1990 | Schaub et al. | 24/20 R |
| 4,987,651 | 1/1991 | Oetiker | 24/20 R |
| 4,998,326 | 3/1991 | Oetiker | 24/20 R |
| 5,191,684 | 3/1993 | Kenwright | 24/20 R |
| 5,375,299 | 12/1994 | Nagano | 24/20 R |

*Primary Examiner*—James R. Brittain
*Attorney, Agent, or Firm*—Paul M. Craig, Jr.

[57] ABSTRACT

A clamp structure with a clamping band which can be used, for example, to fixedly secure a hose on a nipple and which includes a tightening arrangement for tightening the clamp structure about the object to be fastened and a tolerance-compensating arrangement for the entire tolerance range of the hose and nipple. The tolerance-compensating arrangement is thereby formed by a slot-like opening punched-out of the clamping band which is of such width and length that the lateral clamping band portions left on both sides of the slot-like opening provide tolerance compensation at the clamping forces specified by the customer, taking into consideration also the fact that the material of the lateral band portions is work-hardened by the punching-out operation of the tolerance-compensating opening.

24 Claims, 2 Drawing Sheets

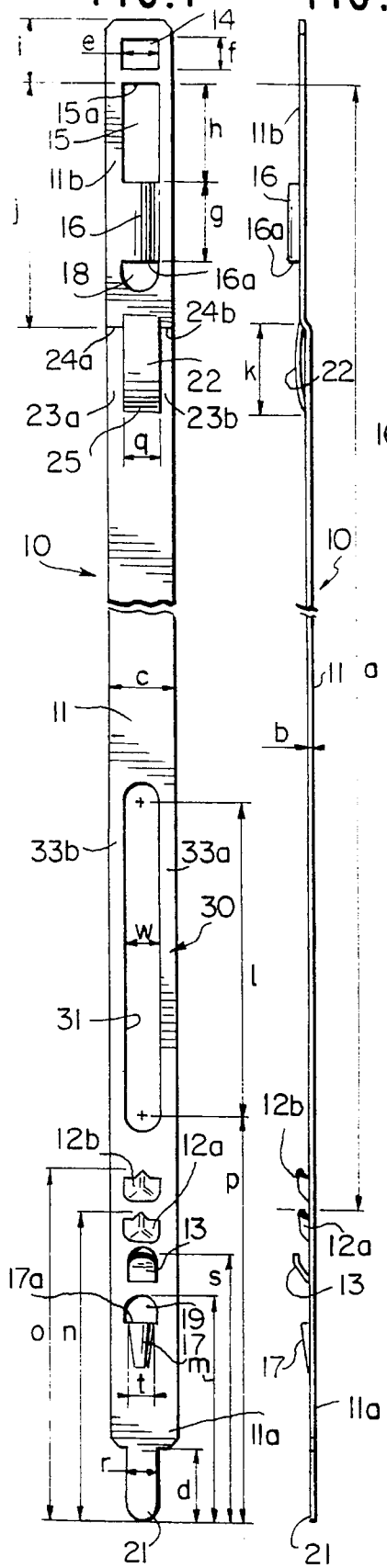
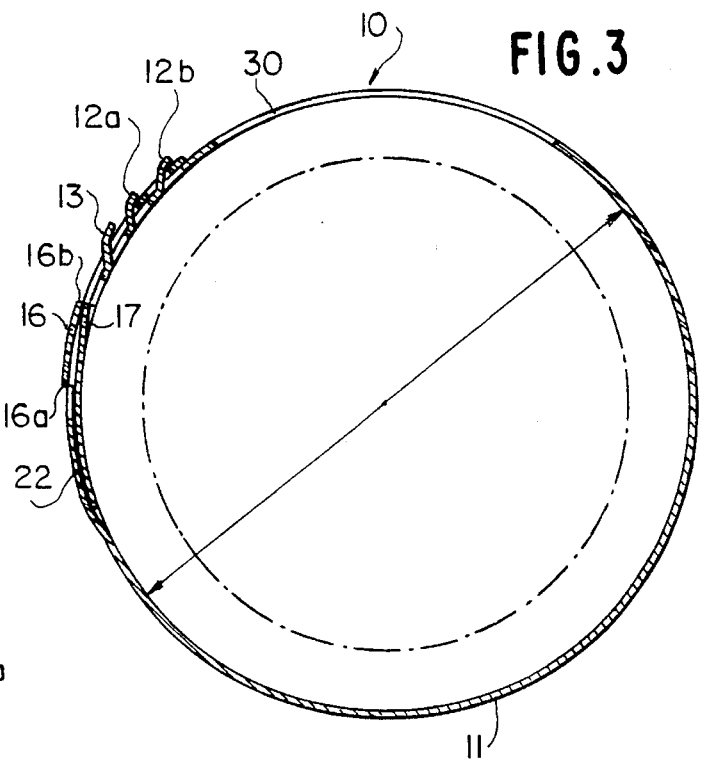
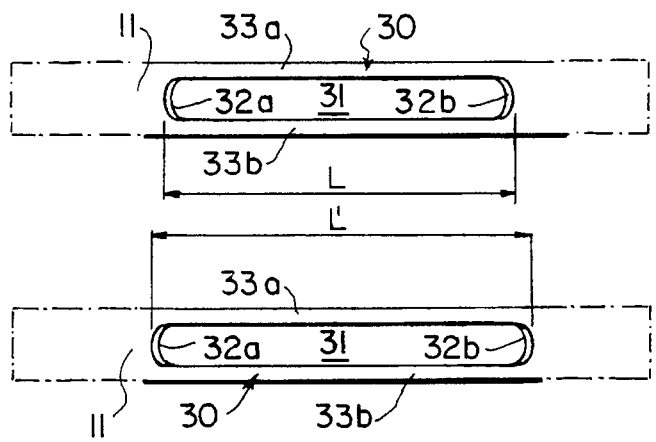

TOLERANCE-COMPENSATING REUSABLE CLAMP STRUCTURE

FIELD OF THE INVENTION

This invention relates to an open clamp made from a clamping band material having low elastic stretchability in its longitudinal direction which is provided with a tolerance-compensating arrangement to compensate for tolerances in the assembly, consisting, for example, of hose and nipple, on which the hose is to be fastened, and more particularly to a so-called low-profile or earless clamp structure of the type described above.

BACKGROUND OF THE INVENTION

Open clamp structures of the earless type are known in the prior art, for example, as disclosed in my prior U.S. Pat. No. 4,492,004. Though the prior art clamps, as disclosed in this patent, have enjoyed immense commercial success, they may not be able to accommodate at all times the entire tolerance range of the assembly consisting of nipple and hose as specified by the customer. This is so as the clamping band material such as stainless steel frequently used for such clamp structures has relatively low elastic stretchability in the longitudinal direction, which may be inadequate to permit a completely satisfactory clamping action over the entire range of tolerances from the minimum dimension of the hose and of the nipple to the maximum dimension of the hose and of the nipple within their respective tolerance ranges. The problem of tolerance compensation in clamp structures has been recognized already for some time and various solutions have been proposed heretofore. For example, the British Patent 778,861 suggested one or more resilient, arcuately shaped compensating portions. Undulations in the clamping band have been proposed in the French Patent 2,470,275 and can also be found in U.S. Pat. Nos. 4,308,648 and 4,919,682. However, to avoid any leakage underneath the undulations, it was necessary to cover the same by the full band width of the inner band portion. Adopting the teachings of the British Patent 1,064,048, the European Patent 0 296 918 suggested to offset undulations located on opposite sides of a central cut. However, the problem remained with these prior art proposals of assuring an internal clamping surface devoid of any steps, offsets or discontinuities. Moreover, the need to cover the undulations with the full-width inner band portion of the clamping band resulted in increased cost owing to the increased length of the clamping band required under these circumstances. Additionally, undulations also involve some cost considerations as regards the requisite length of clamping band in the clamp structure. Other proposals to provide some increased elastic stretchability of the clamping band involved cut-outs in the clamping band. For example, zig-zag shaped cut-outs in the band to impart some elasticity were suggested in U.S. Pat. No. 1,705,895. Other configurations in the clamping band for similar purposes can be found in U.S. Pat. No. 4,910,832 and German Patent DE 30 18 383 as also in my own prior U.S. Pat. No. 4,987,651 which disclosed concavely shaped lateral band portions enclosing therebetween an at least approximately hourglass-shaped opening. Common to all of these last-mentioned prior art proposals is the fact that they require movement of band portions, not only in the direction of the tensional forces, i.e., in the longitudinal direction of the clamping band, but also in a direction transverse thereto as they undergo deformation in the presence of tensional forces.

SUMMARY OF THE INVENTION

The present invention is predicated on the discovery that satisfactory tolerance-compensation can be attained by a simple opening cut out of the clamping band which extends in the clamping band longitudinal direction. The opening produced by punching or stamping out leaves substantially rectilinear lateral band portions on both sides thereof whose outer edges are rectilinear in continuation of the normal band width and which represent an area of reduced resistance to elastic stretchability in the longitudinal direction of the clamping band. The total width of the opening or of several side-by-side openings should be at least as large as the width of any other opening in the clamping band and its length can be readily determined as will be explained more fully hereinafter. A factor to be considered in the tolerance-compensating arrangement of this invention resides in the fact that punching or stamping out the opening in the clamping band in a conventional manner in effect work-hardens the material in the band portions left in the clamping band. Longitudinally extending openings have been proposed heretofore for various reasons such as, for example, to modify the bendability, especially in so-called self-tightening clamps made from spring material seeking to reduce the diametric dimension of the clamp as disclosed in U.S. Pat. No. 4,773,129. Longitudinal openings were also proposed, for example, in my prior U.S. Pat. No. 4,998,326 to compensate for imbalances in the clamp structure. However, the longitudinal cuts or slot-like openings in this last-mentioned patent had to be located within the area where the overlapping band portions caused the imbalance in order to compensate for the additional weight caused thereby within this area. By contrast, there is no such requirement for the location of the tolerance-compensating opening in accordance with this invention in which the tolerance-compensating opening can be located within a non-overlapping area of the clamping band, i.e., within an area of the non-overlapping clamping band that extends from the mechanical connection to the means for tightening the clamp structure. In case the clamp structure also includes some means for avoiding any steps, offsets or discontinuities in the inner clamping surface, the tolerance-compensating arrangement lies within an area of non-overlapping clamping band between the means for avoiding any steps, offsets or discontinuities in the inner clamping surface and the mechanical connection. At any rate, the constraints as to location of the tolerance-compensating opening which exist in some other applications, do not exist for the tolerance-compensating opening of this invention which can be located anywhere at the designer's choice where the tensional forces occur in the clamping band as the latter is tightened. The length and width of the tolerance-compensating opening of this invention is thereby determined by the specified tolerance range which must be satisfied by the clamp structure and the clamping forces to be expected when fully tightened.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a top plan view on a clamp structure of the earless type with a tolerance-compensating arrangement in accordance with the present invention;

FIG. 2 is a side elevational view of the clamp structure of FIG. 1;

FIG. 3 is a transverse cross-sectional view at right angle to the axial direction of the assembled clamp structure in accordance with the present invention;

FIGS. 4a and 4b are partial plan views on a portion of the clamping band provided with a tolerance-compensating opening of this invention and illustrating schematically the effect of the tolerance-compensating opening as a result of the presence of tensional tightening forces in the clamping band.

DETAILED DESCRIPTION OF THE DRAWINGS

Figure 5:
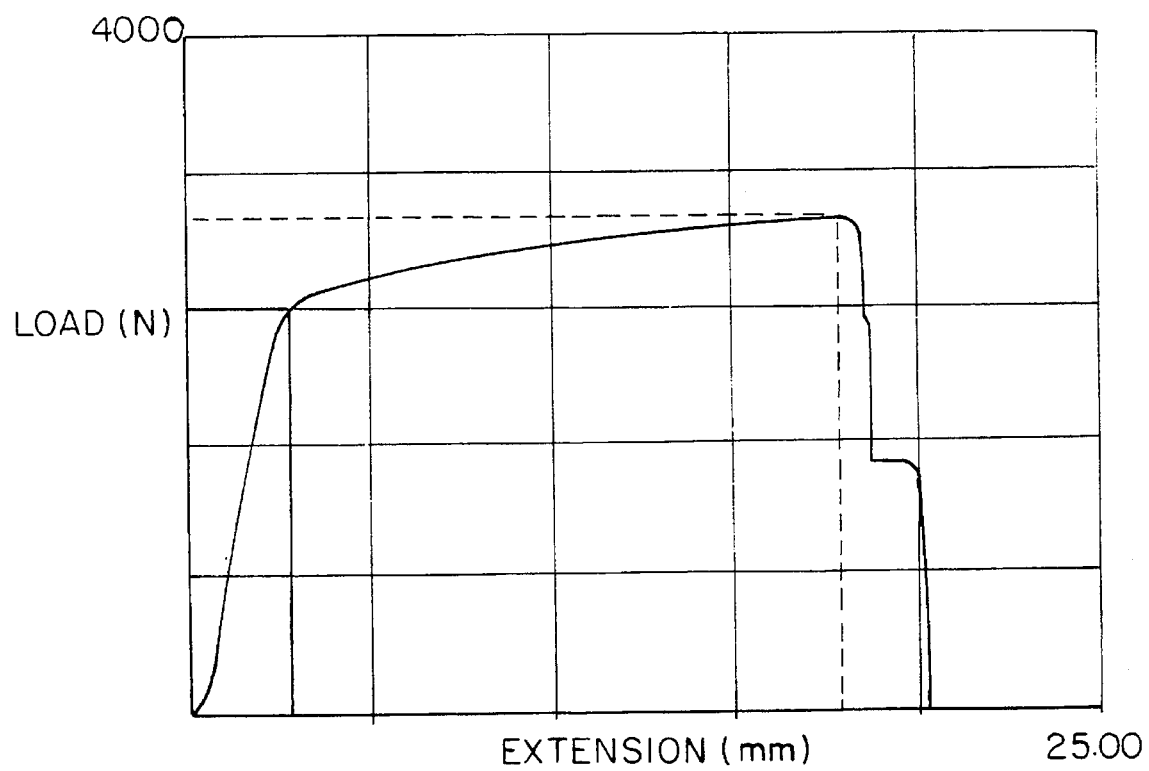
FIG. 5 is a graph illustrating extension in mm. as a function of load in N of a sample of a clamping band having a thickness of 0.8 mm. and a width of 10 mm. with a tolerance-compensating opening of 4.8 mm. in width and 50 mm. in length, in which the clamping band material is stainless steel AISI 304.

Referring now to the drawing wherein like reference numerals are used throughout the various views to designate like parts, the clamp structure generally designated by reference numeral 10 of this invention is a clamp structure similar to that shown in the prior U.S. Pat. No. 5,191,684 and includes a clamping band 11 having an inner clamping band end portion 11a and an outer clamping band end portion 11b which overlap in the assembled condition of the clamp structure. In order to mechanically close the clamp structure made from flat clamping band material as shown in its flat punched-out position in FIGS. 1 and 2, in the closed circular position shown in FIG. 3, the mechanical connection includes one or more cold-deformed deep-drawn support hooks 12a and 12b and a guide hook 13 which are adapted to engage, respectively, in the rectangular aperture 14 and in the elongated aperture 15. The support hooks 12a, and 12b as well as the guide hook 13 may thereby be constructed as more fully disclosed in my prior U.S. Pat. No. 4,199,012. In the preassembled, not-yet tightened condition, the support hook 12a nearer the free end of the inner band portion 11a engages in aperture 14 and the guide hook 13 engages in the elongated aperture 15 while the support hook 12b away from the free end of the inner band portion 11a is located beyond the end of the outer band portion 11b. In the fully installed tightened condition (FIG. 3), the support hook 12b then engages in aperture 14 while the adjoining support hook 12a now engages along the edge 15a of the aperture 15, all as disclosed in the prior U.S. Pat. No. 5,191,684. For tightening the clamp structure about the object to be fastened, a tool-engaging means 16 is provided in the outer band portion 11b and a tool-engaging means 17 is provided in the inner band portion 11a. The tool-engaging means 16 and 17 are thereby in the form of deep-drawn, pressed-out embossments which are partially convexly shaped in cross section as shown in the aforementioned U.S. Pat. No. 5,191,684. The pressed-out tool-engaging means 16 is thereby in the form of a pressed-out longitudinally extending tunnel which has a convex shape of relatively low height with a tool-engaging abutment surface 16a and a torque-limiting tool-engaging abutment surface 16b, the latter to prevent over-torquing of the clamp structure as described in the last-mentioned U.S. patent. The tool-engaging embossment 17 in the inner band portion 11a only has one tool-engaging abutment surface 17a and may taper both in height and in width in the circumferential direction toward the free end of the inner band portion 11a. The tool-engaging embossment 17 is thereby integral with the inner band portion 11a except within the area of the tool-engaging abutment surface 17a pressed-out after a transverse cut in the inner band portion 11a. In transverse cross section, the tool-engaging embossment 17, like embossment 16, is of convex shape having a relatively low height which is lower than the height of the tool-engaging embossment 16 so that the tool-engaging embossment 17 can slide underneath the tool-engaging embossment 16. The tool-engaging embossment 16 is thereby pressed out of the clamping band by deep-drawing cold deformation after two transverse cuts in the clamping band forming the abutment surfaces 16a and 16b. The tool-engaging embossments 16 and 17 may thereby have the shape and dimensions as more fully disclosed in the U.S. Pat. No. 5,191,684, the contents of which are incorporated herein by reference. Openings 18 and 19 of semi-circular shape are provided in the clamping band adjacent the tool-engaging abutment surfaces 17a and 16a to permit the tips of the tightening tool of any conventional appropriate construction (not shown) to extend into these openings so as to increase the effective area of engagement by the tightening tool. These openings 18 and 19 thereby have a maximum width in the clamping band transverse direction greater than the maximum width of the embossments 16 and 17 so that the flat engaging surfaces of the jaws of the plier-like tool engage not only with the tool-engaging surfaces 16a and 17a but also with parts of the lateral band portions exposed by these openings, as described also in the aforementioned U.S. Pat. No. 5,191,684.

To assure an internal clamping surface devoid of any steps, offsets or discontinuities, the inner band end portion 11a terminates in a tongue-like extension 21 adapted to engage into a tongue-receiving means which in the illustrated embodiment is formed by a centrally located pressed-out band portion 22 forming a tongue-receiving channel and leaving on both sides thereof lateral band portions 23a and 23b. The lateral band portions 23a and 23b thereby merge into the normal outside diameter of the outer band portion 11a at first step-like portions 24a and 24b radially displacing the lateral band portions 23a and 23b by a radial distance corresponding substantially to the clamping band thickness while the tongue-receiving channel 22 merges into the normal clamping band at a second step-like portion 25, as also described more fully in my prior U.S. Pat. No. 4,299,012. As the radial displacement produced by the step-like portions 24a and 24b is about equal to the thickness of the clamping band, it is assured thereby that the inner band portion 11a cannot escape outwardly within an area from the step-like portions 24a and 24b to the free end of the outer band portion 11b.

The tolerance-compensating arrangement generally designated by reference numeral 30 consists in accordance with the present invention of a rectangular slot 31 having rounded-off end portions 32a and 32b and leaving lateral band portions 33a and 33b on both sides thereof the edges of which extend rectilinearly in continuation of the edges defining the normal clamping band width. As can be seen from FIGS. 1 and 3, the opening 30 is located in the band portion within the area intermediate the overlapping band portions 11a and 11b, and more particularly also within the area of the non-overlapping clamping band 11 located between hook-like member 12b of the mechanical connection 12, 13, 14, 15 and the tool-engaging means 16. With an arrangement 22, 23a, 23b, 24a, 24b and 25 to eliminate any step, offset or discontinuity in the internal clamping surface, the opening 30 is then located between the hook-like member 12b of the mechanical connection and the step-like portion 25 of the tongue-receiving channel 22.

FIGS. 4a and 4b schematically illustrate the operation of the tolerance-compensating arrangement 30 in accordance with the present invention, the distance L representing in FIG. 4a the length of the compensating opening 31 in the non-stressed condition of the clamping band, laid out flat, while FIG. 4b illustrates the length L' resulting from the application of the tensional tightening forces to the clamping band that cause merely stretching of the lateral band portions 33a and 33b in the longitudinal direction of the clamping band in the presence of these tensional forces substantially without sliding movements in a direction transverse thereto as required, for example, in the arrangements of U.S. Pat. Nos. 1,708,895; 4,987,651; 5,230,246 or 4,910,832. The clamping band is, again laid out flat in FIG. 4b for purposes of comparison. FIGS. 4a and 4b are thereby not drawn to scale and are only for illustrative purposes.

Typical values for one size clamp which are indicated herein only for purposes of illustration and which can be varied as known to those skilled in the art, are as follows:

The thickness b (FIG. 2) of the clamping band 11 made from stainless steel AISI 304 is 0.8 mm. and the width c (FIG. 1) of the clamping band is 10 mm. The length d of the tongue-like extension 21 is 11 mm., the end of the full width clamping band end portion 11a being chamfered at a 45° angle. The width e of aperture 14 is 4.8 mm. and its length f is 4.7 mm. The length g of the tunnel-shaped embossment 16 is 12.2 mm. and the length h of aperture 15 is 15.9 mm. The distance i from the free end of the outer band portion 11b to the transverse end surface 15a of the aperture 15 nearer the free end of the outer band portion is 9.9 mm. and the distance j from the step-like portions 24a and 24b to the end surface 15a of the aperture 15 is 37.1 mm. while the length k of the tongue-receiving channel 22 is 13 mm. The length i (FIG. 1) of the slot 31 is 50 mm., the rounded-off end portions 32a and 32b being semi-circular in shape. The distance m from the end of the tongue-like extension 21 to the end of aperture 19 opposite the tool-engaging surface 17a is 35 mm., the distance from the end of the tongue-like extension 21 to the end of the first support hook 12a nearer the free end of the tongue-like extension 21 is 45.6 mm., the distance o from the end of the tongue-like extension to the end of the second support hook 12b is 52.5 mm. and the distance p from the end of the tongue-like extension 21 to the end of the full-width rectangular portion of opening 31 nearer the free end of the inner band portion 11a is 62 mm. The width q of the tongue-receiving channel 22 is 4.2 mm., the width r of the tongue-like extension 21 is 4 mm. and the distance s from the end of the tongue-like extension 21 to the end of the guide hook 13 is 41.2 mm. The maximum width of the tool-engaging embossment 17 is about 3.8 mm. The width w of opening 31 is 4.8 mm. while the lateral band portions 33a, 33b each have a width in the transverse direction of 2.6 mm. As the width w of opening 31 is increased, the width of the lateral band portions 33a and 33b will decrease, thereby reducing resistance of the latter to elastic stretching in the longitudinal direction of the clamping band in the presence of tensional forces. The overall length a (FIG. 2) can be chosen at will for a given nominal diametric dimension of the clamp structure, only the dimensions indicated hereinabove being important for any given diameter size. The openings 18 and 19 are made with a radius of 4.5 mm. and may each include a small portion beyond the semi-circle which extends rectilinearly in the direction of the clamping band longitudinal direction. The foregoing dimensional indications are only for purposes of illustration and may be varied as known to those skilled in the art to suit any particular clamp design. For example, it is also possible, depending on width of the clamping band to substitute for the single central opening 30 two or more slot-like openings in the clamping band which extend in the longitudinal direction of the clamping band as long as the total area of these openings corresponds to the needed area to provide the required tolerance compensation in the remaining clamping band portions.

The length and width of the tolerance-compensating opening 30 can be readily determined empirically. It is only necessary to make a test sample of the band material from which the clamping band is made, cut an opening of a certain width and length, and then subject the test sample in steps to ever-increasing tensional forces until the tensional forces are reached which are expected in the fully tightened clamp structure. By measuring the increase in length (stretching) and noting the subsequent elastic return of the test sample, one can arrive in a short time by trial and error at the proper length and width for the opening 30 with a given material, whereby prior experience with a given material will permit short-cuts in this approach, which must also take into consideration the necessity that the clamp structure with such opening must be able to pass satisfactorily all leakage tests normally required of a given clamp structure. This can be assured, if needed, by a trade-off in the width of the opening versus its length.

A more scientific approach is as follows. Taking a stainless steel clamping band material having a yield strength of 345 MPa, a slot-like opening 4.8 mm. wide and 54.8 mm. long with 2.4 mm. radius at each end is punched out of the central area of the clamping band having a width of 10 mm. and a thickness of 0.8 mm., thereby leaving lateral band portions of 2.6 mm. on each side of the slot-like opening. This means that the clamping band has a remaining cross-sectional area of $$2\ (W \times T) = 2\ (2.6 \times 0.8) = 4.16\ mm^2$$

The raw material having a rated yield strength of 345 MPa would assure that the clamping band in the slot area would withstand a tensile load of 1434 N (345×4.16) prior to exceeding the yield point. However, stamping the slot-like opening out of the clamping band, work-hardens the material so that the yield point increases. The elongation at yield point as determined by tests, then becomes 1.4 mm. which translates to an increase of about 0.5 mm. in clamp diameter without exceeding the clamping band material yield strength.

Taking a clamp structure described in the typical example made from 304 AISI stainless steel with a band width of 10 mm. and a thickness of 0.8 mm.

the yield strength of the raw material m 392 N/mm², and its ultimate strength=654 N/mm².

The mechanical properties increase as the material is cold-worked, i.e., stamping the slot will increase the yield strength and ultimate strength as follows:

Yield strength with slot configuration=549 N/mm² and
Ultimate strength with slot configuration=705 N/mm².

The yield strength with slot configuration leaving band portions of 2.6 mm. on each side of the 4.8 mm. slot-like opening will therefore be $$2\ (W \times T) \times 579 = 2408\ N$$

This translates into an elongation of 1.7 mm., as can be seen from the graph of FIG. 5, representing a typical load v. extension graph for the sample with slot configuration. The 1.7 mm. elongation corresponds to a diameter increase, not exceeding yield strength=1.7/π, thus providing a diameter increase Δ diameter of about 0.54 mm.

The ultimate yield strength with slot configuration would be 2 (W×T)×705=2934 N.

As can be seen from the graph of FIG. 5, at ultimate strength of 2934 N, the elongation would be 10.74 mm. which corresponds to a diameter compensation, not exceeding ultimate strength, of 0.27 mm.

The elongation can be referred to as a percentage of the original graph length (L) which percentage remains constant.

In the example an elongation of 0.54 mm. represents an elongation of 3.4%. For example, with a length L=25 mm., the diameter compensation would be 25×0.034/π=0.27 mm.

While I have shown and described only one embodiment in accordance with the present invention, it is understood that the tolerance-compensating arrangement of this invention is not limited thereto but may be applied to any other type of clamp structure in which certain tolerance compensation must be achieved to meet a customer's requirements. For example, the tolerance-compensating arrangement of this invention may also be used with a clamp having a typical so-called "Oetiker" ear as shown and described in my prior U.S. Pat. No. 4,299,012 or in my U.S. Pat. No. 5,339,496 to issue on Aug. 23, 1994. It may also be used with a clamp, for example, as shown and described in my pending application Ser. No. 08/163,530, filed on Dec. 9, 1993 and entitled "Clamp Structure With Sawtooth-Like Locking Arrangement", the subject matter of which is incorporated herein by reference. Additionally, though the mechanical connection consisting of hooks 12 and 13 and apertures 14 and 15 are of the type shown and described in my prior U.S. Pat. No. 4,299,012, the guide hook 12 may also be replaced by a combined guide and support hook as shown and disclosed in my prior U.S. Pat. No. 4,622,720. Furthermore, any other known mechanical connection for the overlapping band end portions may be used. As mentioned above, the tightening arrangement may also be replaced by a so-called "Oetiker" ear provided with reinforcing means, for example, as disclosed in my prior U.S. Pat. No. 3,475,793 or preferably in the shape of a shallow depression of substantially rectangular configuration as disclosed in my prior U.S. Pat. No. 5,282,295. In lieu of a single depression, also two substantially parallel reinforcing depressions may be used in the bridging portion which encompasses the same total area mentioned in U.S. Pat. No. 5,282,295 or in my copending application Ser. No. 07/629,716, filed Dec. 18, 1990 and entitled "Reinforced Ear Structure for Clamps," the subject matter of which is incorporated herein. Moreover, the means 21, 22, 23, 24 and 25 of this invention to assure an internal clamping surface devoid of any step, offset or discontinuity, may also be achieved as disclosed in my prior U.S. Pat. No. 4,315,348 or in my prior U.S. Pat. No. 4,237,584 or as disclosed in FIGS. 6 to 11 of my prior U.S. Pat. No. 5,283,931. Thus, the present invention is not limited to the particular embodiments as shown and described herein and/or to their dimensions as described herein but is applicable to other modified clamp structures involving similar problems. I therefore do not wish to be limited to the details shown and described herein but intend to cover all such changes and modifications as are encompassed by the scope of the appended claims.

I claim:

1. An open clamp structure, comprising clamping band means made from a clamping band material having low elastic stretchability in its longitudinal direction and of predetermined width having end portions operable to be mutually overlapped radially in the installed condition as inner and outer band end portions, respectively, means in the clamp structure to enable installing the same over one part to be fastened on another part including means for mechanically connecting the radially overlapping end portions and for tightening the clamp structure about the one part, and tolerance-compensating means in said clamping band means operable to compensate for tolerances in the part and in said another part including at least one opening means extending in the longitudinal direction of said clamping band means and leaving substantially rectilinear lateral band portions on both sides thereof, said lateral band portions having outer edges in continuation of the width of said clamping band means, the width of said opening means being at least substantially as wide as any other aperture in said clamping band means and the length of said opening means being a function of the yield strength and ultimate strength of said lateral band portions as modified by work hardening by removal of the material forming the opening means.

2. A clamp structure according to claim 1, wherein said opening means is stamped out of the clamping band means.

3. A clamp structure according to claim 1, wherein said opening means is of substantially rectangular shape.

4. A clamp structure according to claim 3, wherein said opening means has rounded-off end portions.

5. A clamp structure according to claim 1 wherein said opening means is located in a non-overlapping area of the clamping band means in the area between the means for mechanically connecting the overlapping end portions and for tightening the clamp structure.

6. A clamp structure according to claim 1, wherein said means mechanically connecting overlapping end portions includes hook means in one of said end portions and aperture means in the other of said end portions, and additional means in said clamping band means to assure an internal clamping surface devoid of any offset, step or discontinuity including tongue-like means in one of said band end portions and tongue-receiving means in the other of said band end portions, said opening means being located within a non-overlapping area of the clamping band means.

7. A clamp structure according to claim 1, wherein said means mechanically connecting overlapping end portions includes hook means in one of said end portions and aperture means in the other of said end portions, at least one of said aperture means having a width substantially equal to the width of said opening means and also extending in the longitudinal direction of the clamping band means so that said last-mentioned aperture means also contributes to the tolerance compensation of the clamp structure.

8. A clamp structure according to claim 7, wherein said clamp structure is an open clamp structure and wherein the means for tightening the clamp structure is substantially devoid of any tolerance compensation.

9. A clamp structure according to claim 8, wherein said tightening means are formed by embossment means integral with the clamping band means in the longitudinal direction thereof.

10. A clamp structure according to claim 1, wherein said tolerance-compensating means is formed substantially exclusively by opening means of predetermined width and extending in the longitudinal direction of the clamping band means.

11. A clamp structure according to claim 1, wherein said opening means is located exclusively in the area inside of the predetermined width of said clamping band means.

12. A clamp structure, comprising clamping band means made from a clamping band material having low elastic stretchability in its longitudinal direction and of predetermined width having end portions operable in the installed condition to be mutually overlapped in the radial direction, means in the clamp structure to enable mounting the same over one part to be fastened thereby on another part including means for mechanically connecting the overlapping end portions and for tightening the clamp structure about the one part, and tolerance-compensating means in said clamping band means operable to compensate for tolerances in the one part and in said another part, said tolerance-compensating means being formed by an area of substantially rectilinear lateral band portions separated by a slot-like opening means, said lateral band portions having substantially rectilinear outer edges in continuation of the width of said clamping band means but each of reduced band width to offer reduced resistance to elastic stretching in the longitudinal direction of the clamping band means under tensional loads compared to the normal full-width clamping band means, and the area of said opening means being dependent on the yield strength and ultimate strength of said clamping band material in the area of said lateral band portions as modified by work-hardening by removal of material forming the opening means.

13. A clamp structure according to claim 12, wherein the band portions having reduced band width are formed by at least one opening means in the clamping band means leaving lateral band portions of a width representing each less than about 30% of the normal band width of the clamping band means.

14. A clamp structure according to claim 12, wherein said tolerance-compensating means is formed exclusively by opening means.

15. A clamp structure according to claim 14, wherein said clamp structure is an open clamp structure and wherein the means for tightening the clamp structure is substantially devoid of any tolerance compensation.

16. A clamp structure according to claim 15, wherein said tightening means are formed by embossment means integral with the clamping band means in the longitudinal direction thereof.

17. A clamp structure according to claim 16, wherein said embossments means are of substantially complementary configuration and are provided in the inner and outer band portions of the clamping band means in such a manner that the embossment means in the inner band portion is able to slide underneath the embossment in the outer band portion.

18. A clamp structure according to claim 12, wherein said tolerance-compensating means is formed by an opening means located exclusively inside of the normal width of said clamping band means.

19. An open clamp structure, comprising clamping band means made from a clamping band material having low elastic stretchability in its longitudinal direction and of predetermined width having end portions operable to be radially overlapped with respect to one another in the installed condition and with opening means in said clamping band means intermediate said end portions to leave lateral band portions on both sides of said opening means, and means in the clamp structure for installing the same over one part to be fastened on another part including means for mechanically connecting the radially overlapping end portions and for tightening the clamp structure about the one part, characterized by further means in said clamping band means operable to provide a predetermined compensation for tolerances in the part and in said another part by determining the length and width of said opening means as a function of the yield strength and ultimate strength of said lateral band portions modified as a result of work hardening by removal of the material forming the opening means.

20. An open clamp structure, comprising clamping band means made from a clamping band material having low elastic stretchability in its longitudinal direction and of predetermined width having end portions operable to be radially overlapped with respect to one another in the installed condition and with opening means in said clamping band means intermediate said end portions to leave lateral band portions on both sides of said opening means, and means in the clamp structure for installing the same over one part to be fastened on another part including means for mechanically connecting the radially overlapping end portions and for tightening the clamp structure about the one part, characterized by further means in said clamping band means operable to provide tolerance compensation for tolerances in the part and in said another part by determining the widths of said lateral band portions and the length of said opening means as a function of the yield strength and of the ultimate strength of said band material modified by work-hardening in the removal of band material forming said opening means to obtain a predetermined increase in the clamp diameter under a maximum tensional load not exceeding the yield strength.

21. An open clamp structure according to claim 20, wherein said opening means leaves substantially rectilinear lateral band portions on both sides thereof, said lateral band portions having outer edges in continuation of the width of said clamping band means and the width of said opening means being at least substantially as wide as any other aperture in said clamping band means.

22. An open clamp structure according to claim 20, wherein said further means is located in a non-overlapped part of said clamping band means.

23. A clamp structure according to claim 20, comprising additional means in said clamping band means to assure an internal clamping surface devoid of any offset, step or discontinuity including tongue-like means in one of said band end portions and tongue-receiving means in the other of said band end portions, said opening means being located within a non-overlapped area of the clamping band means intermediate said additional means and the mechanical connecting means in the other band end portion.

24. A clamp structure according to claim 23, wherein said tongue-receiving means is formed in an inwardly directed step-like portion of the outer band end portion having a height substantially corresponding to the thickness of said clamping band means.

* * * * *